US008422407B2

(12) United States Patent
Sumcad et al.

(10) Patent No.: US 8,422,407 B2
(45) Date of Patent: Apr. 16, 2013

(54) METHOD FOR MANAGING DATA TRANSMISSIONS IN A SUBSCRIBER POOL

(75) Inventors: Anthony J. Sumcad, Southfield, MI (US); Navjot Sidhu, Mountain View, CA (US); Kevin R. Krause, Plymouth, MI (US)

(73) Assignee: General Motors LLC, Detroit, MI (US)

( * ) Notice: Subject to any disclaimer, the term of this patent is extended or adjusted under 35 U.S.C. 154(b) by 553 days.

(21) Appl. No.: 12/761,180

(22) Filed: Apr. 15, 2010

(65) Prior Publication Data

US 2011/0255481 A1 Oct. 20, 2011

(51) Int. Cl.
*H04L 12/16* (2006.01)
(52) U.S. Cl.
USPC ............ 370/265; 370/270; 370/328; 455/419
(58) Field of Classification Search .................. 455/417, 455/418, 419, 551, 550.1; 371/259, 270, 371/310, 328, 329, 330, 331, 332, 333, 334
See application file for complete search history.

(56) References Cited

U.S. PATENT DOCUMENTS

| 6,493,552 | B1 | 12/2002 | Hicks |
| 6,625,117 | B1* | 9/2003 | Chen et al. .................... 370/227 |
| 6,781,983 | B1 | 8/2004 | Armistead |
| 7,289,786 | B2* | 10/2007 | Krasner ..................... 455/404.2 |
| 7,305,236 | B2 | 12/2007 | Schwinke et al. |
| 7,415,271 | B2 | 8/2008 | Nicolini |
| 2004/0032865 | A1 | 2/2004 | Kwon |
| 2005/0025134 | A1 | 2/2005 | Armistead |
| 2005/0090275 | A1* | 4/2005 | Wang ............................ 455/512 |
| 2005/0208936 | A1* | 9/2005 | Sumcad et al. ............... 455/423 |
| 2006/0079203 | A1 | 4/2006 | Nicolini |
| 2006/0079219 | A1* | 4/2006 | Nicolini ........................ 455/423 |
| 2006/0126584 | A1 | 6/2006 | Zhang et al. |
| 2006/0268916 | A1 | 11/2006 | Sarkar |
| 2007/0112504 | A1* | 5/2007 | Krause et al. ................. 701/200 |
| 2008/0207246 | A1* | 8/2008 | Shanbhag et al. ............ 455/522 |
| 2009/0164551 | A1 | 6/2009 | Oesterling et al. |
| 2009/0197593 | A1* | 8/2009 | Farrell et al. ................ 455/426.1 |
| 2010/0248695 | A1* | 9/2010 | Cepuran .................. 455/414.1 |

* cited by examiner

*Primary Examiner* — Phirin Sam
*Assistant Examiner* — Mounir Moutaouakil
(74) *Attorney, Agent, or Firm* — Dierker & Associates, P.C.

(57) ABSTRACT

A method for managing data transmissions in a subscriber pool involves receiving a telematics unit call at a call center on a channel other than a packet data channel, and from the call and at the call center, recognizing that the packet data channel is unavailable in a predetermined coverage region. A notification is transmitted to the telematics unit and/or to a plurality of telematics units in the predetermined coverage region indicating that the packet data channel is unavailable for a predetermined time. In response to the notification, a vehicle data upload setting is reset in the telematics unit and/or each of the plurality of telematics units to an alternate channel such that primary connection attempts made by the telematics unit and/or each of the plurality of telematics units are via the alternate channel during the predetermined time. A system for managing such data transmissions is also disclosed.

16 Claims, 2 Drawing Sheets

FIG. 3

METHOD FOR MANAGING DATA TRANSMISSIONS IN A SUBSCRIBER POOL

TECHNICAL FIELD

The present disclosure relates generally to methods for managing data transmissions in a subscriber pool.

BACKGROUND

Telematics systems are often used for transmitting data from a vehicle to a call center. The data may be transmitted in the form of packet data using, for example, a packet data channel connection established between the telematics system and the call center. Although such connections are typically reliable, packet data channel connections may be susceptible to, e.g., traffic or outages in one or more coverage regions. During these traffic situations or outages, the telematics unit may, in some instances, continue to attempt a packet data channel connection for several attempts or for a predetermined period of time despite its unavailability before switching to an alternate channel, such as one that may be used to establish a voice connection.

SUMMARY

A method for managing data transmissions in a subscriber pool is disclosed herein. The method involves receiving a call from a telematics unit at a call center on a channel other than a packet data channel, and from the call and at the call center, recognizing that the packet data channel is unavailable in a predetermined coverage region. The method further involves transmitting a notification to the telematics unit and/or to a plurality of telematics units in the predetermined coverage region indicating that the packet data channel is unavailable for a predetermined time. In response to the notification, a vehicle data upload setting is reset in the telematics unit and/or each of the plurality of telematics units to an alternate channel for the predetermined time such that primary connection attempts made by the telematics unit and/or each of the plurality of telematics units are via the alternate channel during the predetermined time.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Packet data channels are often utilized by telematics systems to conveniently and efficiently transmit data from an in-vehicle telematics unit to a call center, and visa versa. As used herein, the term "packet data" or "packet-switched data" is data that is split up into smaller pieces referred to as packets. In some cases, transmission of packet data uses single-carrier radio transmission technology (i.e., 1xRTT), which is a family member of a CDMA2000 single wireless standard that supports data transmission speeds up to about 144 kBps. In the form of packets, the data may be easily transmitted using various transmission technologies including the Internet or via a cellular network, to name a couple. Packet data channels are also advantageously configured to consume network resources only during actual transmission of the data. This is unlike other transmission methods (such as, e.g., via circuit-switched data channels), which often require an open data connection that utilizes network resources even during an idling state.

Packet data channels are typically supported by a network provider, and are often available in predetermined coverage regions (i.e., specific channels are available in specific geographic regions). In some instances, a packet data channel may be rendered unavailable, for example, by the network provider when the channel is undergoing maintenance and/or is not working properly. Such unavailability of the packet data channel may be referred to herein as an "outage". The packet data channel may also or otherwise be rendered unavailable when the channel is overwhelmed with calling traffic (i.e., the number of calls is overwhelming the system and units are unable to access the packet data channel in a particular geographic region, or a subset of the particular geographic region, or a group of geographic regions). In some current telematics systems, the telematics unit attempts to establish a packet data channel connection despite the unavailability of the packet data channel. Such attempts may occur, for example, at least once before switching to an alternate channel, or such attempts occur continuously until a packet data channel connection is established. In any event, such repeated attempt(s) at a packet data channel connection when the channel is unavailable is/are often time consuming, economically inefficient, and tend to unnecessarily consume network resources (such as, e.g., the bandwidth that may otherwise be available for the packet data channel).

Accordingly, example(s) of the method as disclosed herein may advantageously be used, by an in-vehicle telematics unit, to automatically switch to another data transmission channel after the telematics unit has been notified that the packet data channel is then-currently unavailable. The other channel (which is referred to herein as an "alternate channel", and includes any available data transmission channel other than a packet data channel) may be used to transmit data from the telematics unit to the call center, or visa versa. The transmission of the data using the alternate channel may occur, for example, until the telematics unit has been notified that the packet data channel has been restored or has otherwise become available.

The switch to the other, alternate channel when the packet data channel is rendered unavailable advantageously releases network resources for the packet data channel that may otherwise be consumed by the telematics unit so that the packet data channel may be repaired quickly and accurately. The example(s) of the method are also advantageously used to notify subscriber vehicles then-currently located in the coverage region (also referred to as a "subscriber pool", which includes any vehicle that subscribes to telematics services) experiencing the unavailability of the packet data channel. It is to be understood that a subscriber vehicle is then-currently located in the coverage region when i) the vehicle is physically located in the coverage region, or ii) the vehicle is located within a predetermined radius of the predetermined coverage region (e.g., within 10 miles, 30 miles, or another predefined distance from the periphery of the coverage region). Such notification allows the respective telematics units of the subscriber vehicles not to waist time and/or resources with attempting to connect with an unavailable packet data channel.

It is to be understood that, as used herein, the term "user" includes a vehicle owner, operator, and/or passenger. It is further to be understood that the term "user" may be used interchangeably with the term subscriber/service subscriber.

Additionally, the terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

Also, the term "communication" is to be construed to include all forms of communication, including direct and indirect communication. As such, indirect communication may include communication between two components with additional component(s) located therebetween.

It is to be understood that the examples of the method disclosed herein may be performed in any system including a communications device capable of transmitting data, particularly packet data. A non-limiting example of such a communications device includes a vehicle dedicated communications unit such as a telematics unit. In this example, the data being transmitted via the packet data channel includes vehicle data, examples of which include gas mileage, miles driven, minutes of SDARS (satellite digital audio radio service) usage, tire pressure, fluid levels, status of various vehicle systems (e.g., ignition status), status of vehicle components, user operation and/or driving data, and/or the like. For purposes of illustration, the examples of the method will be described hereinbelow for use in conjunction with a telematics unit (identified by reference numeral 14 in FIG. 1), that is operatively disposed in a vehicle (identified by reference numeral 12 in FIG. 1). This system is considered to be an example of a system 10 for managing data transmissions in a subscriber pool, and will be described in detail below at least in conjunction with FIG. 1.

Figure 1:
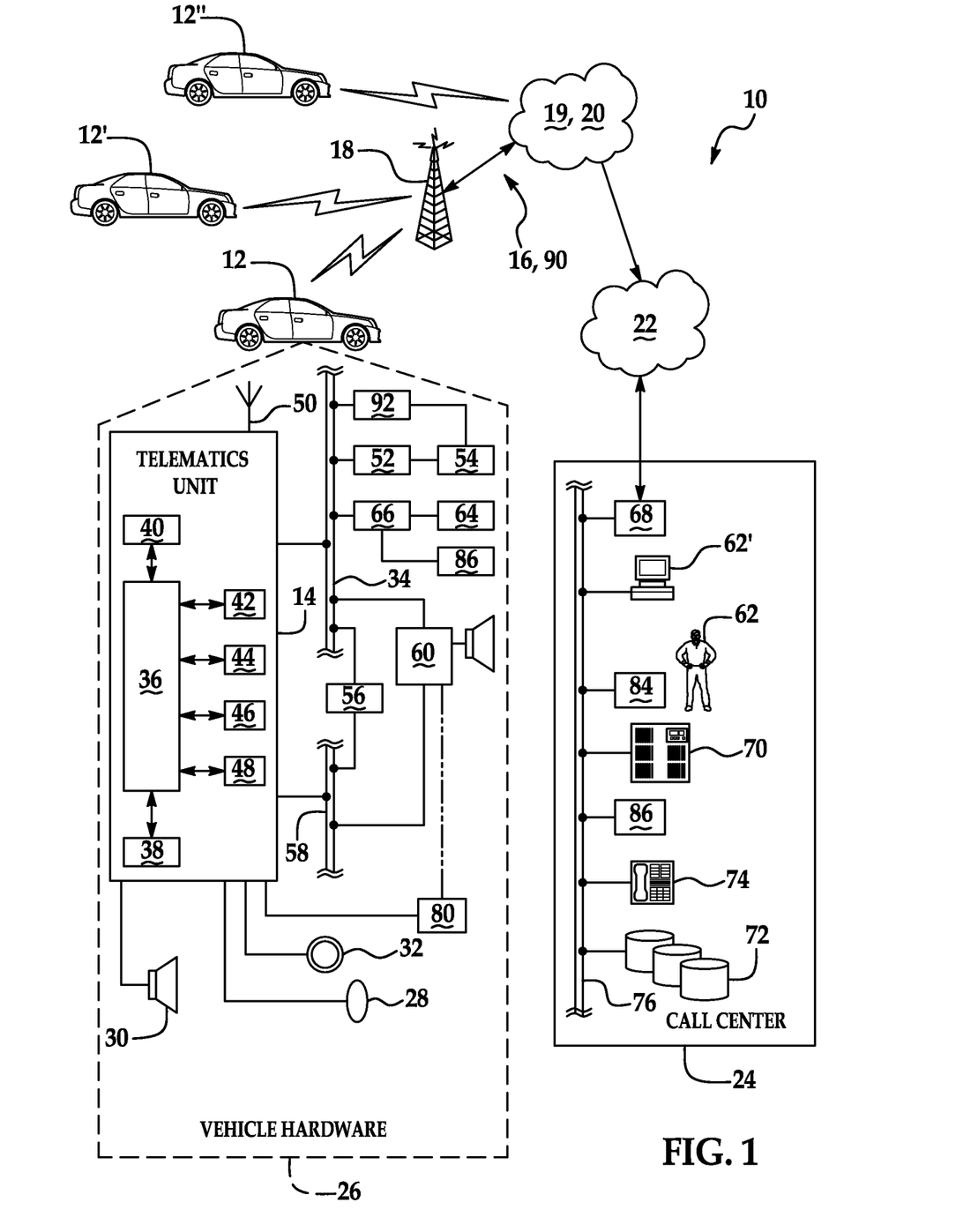
FIG. 1 is a schematic diagram depicting an example of a system for managing data transmissions in a subscriber pool.

Referring now to FIG. 1, the system 10 includes a plurality of vehicles 12, 12', 12", a telematics unit in each respective vehicle 12, 12', 12" (such as the telematics unit 14 of vehicle 12 as shown in FIG. 1), a carrier/communication system 16 (including, but not limited to, one or more cell towers 18, one or more base stations 19 and/or mobile switching centers (MSCs) 20, and one or more service providers (not shown)), one or more land networks 22, and one or more call centers 24. In an example, the carrier/communication system 16 is a two-way radio frequency communication system.

Although three vehicles 12, 12', 12" are shown in FIG. 1, it is to be understood that system 10 may include as few as one subscriber vehicle 12 in the predetermined coverage region, or as many vehicles (i.e., greater than three) that are subscribers of the telematics services that happen to be present in the predetermined coverage region.

The overall architecture, setup and operation, as well as many of the individual components of the system 10 shown in FIG. 1 are generally known in the art. Thus, the following paragraphs provide a brief overview of one example of such a system 10. It is to be understood, however, that additional components and/or other systems not shown here could employ the method(s) disclosed herein.

Vehicle 12 is a mobile vehicle such as a motorcycle, car, truck, recreational vehicle (RV), boat, plane, etc., and is equipped with suitable hardware and software that enables it to communicate (e.g., transmit and/or receive voice and data communications) over the carrier/communication system 16. It is to be understood that the vehicle 12 may also include additional components suitable for use in the telematics unit 14.

Some of the vehicle hardware 26 is shown generally in FIG. 1, including the telematics unit 14 and other components that are operatively connected to the telematics unit 14. Examples of such other hardware 26 components include a microphone 28, a speaker 30 and buttons, knobs, switches, keyboards, and/or controls 32. Generally, these hardware 26 components enable a user to communicate with the telematics unit 14 and any other system 10 components in communication with the telematics unit 14.

Operatively coupled to the telematics unit 14 is a network connection or vehicle bus 34. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few. The vehicle bus 34 enables the vehicle 12 to send and receive signals from the telematics unit 14 to various units of equipment and systems both outside the vehicle 12 and within the vehicle 12 to perform various functions, such as unlocking a door, executing personal comfort settings, and/or the like.

The telematics unit 14 is an onboard device that provides a variety of services, both individually and through its communication with the call (or data) center 24. For instance, the telematics unit 14 is capable of transmitting data to the call center 24 using a number of different data transmission channels, where a connection with one or more of such channels may be accomplished using a wireless connection. In an example, the telematics unit 14 may establish a connection with a packet data channel when such channel is available. In another example, the telematics unit 14 may establish a connection with an alternate channel (i.e., a channel other than the packet data channel as stated above) when the packet data channel is rendered unavailable.

The telematics unit 14 generally includes an electronic processing device 36 operatively coupled to one or more types of electronic memory 38, a cellular chipset/component 40, a wireless modem 42, a navigation unit containing a location detection (e.g., global positioning system (GPS)) chipset/component 44, a real-time clock (RTC) 46, a short-range wireless communication network 48 (e.g., a BLUETOOTH® unit), and/or a dual antenna 50. The telematics unit 14 may further include a vehicle data upload (VDU) system 92. In one example, the wireless modem 42 includes a computer program and/or set of software routines executing within processing device 36.

It is to be understood that the telematics unit 14 may be implemented without one or more of the above listed components, such as, for example, the short-range wireless communication network 48. It is to be further understood that telematics unit 14 may also include additional components and functionality as desired for a particular end use.

The electronic processing device 36 may be a micro controller, a controller, a microprocessor, a host processor, and/or a vehicle communications processor. In another example, electronic processing device 36 may be an application specific integrated circuit (ASIC). Alternatively, electronic processing device 36 may be a processor working in conjunction with a central processing unit (CPU) performing the function of a general-purpose processor.

The VDU system 92 is generally configured to receive raw vehicle data or recordings from the bus 34, packetize the data, and upload the packetized raw data to the call center 24 (or other external entity). The receiving and uploading of the raw vehicle data may be accomplished in response to a vehicle data upload event that takes place, e.g., at some predetermined interval (e.g., all stored vehicle data is uploaded to the call center 24 every 20 minutes) or in response to some trigger (e.g., once the telematics unit 14 recognizes that a new vehicle data reading as been received and/or has been requested by, e.g., the call center 24). The VDU system 92 is operatively connected to the processor 36, and thus is in communication with the call center 24 via the bus 34 and the communication system 16. While not shown in FIG. 1, it is to be understood that the VDU system 92 may also be the telematics unit's 14 central data system that can include a modem, a processor, and an on-board database. The database may be implemented using a separate network attached storage (NAS) device or be located elsewhere, such as in the memory 38, as desired. The VDU system 92 includes an application program that handles all of the vehicle data upload processing, including communication with the call center 24 and the configuring and processing of settings and/or triggers. In an example, the VDU system 92 is configured with a default setting that utilizes a packet data channel as a primary connection means with an external entity (such as the call center 24). As will be described in further detail below, the default setting may, in some cases, be reset to an alternate channel in the event that the packet data channel is rendered unavailable, and then reset back to the default setting once the packet data channel has been restored.

In an example, the processing device 36 (also referred to herein as a processor) is configured with suitable computer programs and/or software enabling the processor 36 to perform at least some of the steps of the examples of the data transmission method disclosed herein. For instance, the processor 36 includes computer readable code for resetting the vehicle data upload setting to an alternate channel for a predetermined time such that primary connection attempts made by the telematics unit 14 during the predetermined time are via the alternate channel. The processor 36 further includes computer readable code for re-initiating the transmission of data to the call center 24 using the packet data channel when notified that the packet data channel has again become available. In other words, the processor 36 also includes computer readable code for resetting the vehicle data upload setting back to the packet data channel upon receiving confirmation of its availability.

The location detection chipset/component 44 may include a Global Position System (GPS) receiver, a radio triangulation system, a dead reckoning position system, and/or combinations thereof. In particular, a GPS receiver provides accurate time and latitude and longitude coordinates of the vehicle 12 responsive to a GPS broadcast signal received from a GPS satellite constellation (not shown).

The cellular chipset/component 40 may be an analog, digital, dual-mode, dual-band, multi-mode and/or multi-band cellular phone. The cellular chipset-component 40 uses one or more prescribed frequencies in the 800 MHz analog band or in the 800 MHz, 900 MHz, 1900 MHz and higher digital cellular bands. Any suitable protocol may be used, including digital transmission technologies such as TDMA (time division multiple access), CDMA (code division multiple access) and GSM (global system for mobile telecommunications). In some instances, the protocol may be short-range wireless communication technologies, such as BLUETOOTH®, dedicated short-range communications (DSRC), or Wi-Fi.

Also associated with electronic processing device 36 is the previously mentioned real time clock (RTC) 46, which provides accurate date and time information to the telematics unit 14 hardware and software components that may require and/or request such date and time information. In an example, the RTC 46 may provide date and time information periodically, such as, for example, every ten milliseconds.

The telematics unit 14 provides numerous services, some of which may not be listed herein, and is configured to fulfill one or more user or subscriber requests. Several examples of such services include, but are not limited to: turn-by-turn directions and other navigation-related services provided in conjunction with the GPS based chipset/component 44; airbag deployment notification and other emergency or roadside assistance-related services provided in connection with various crash and or collision sensor interface modules 52 and sensors 54 located throughout the vehicle 12; and infotainment-related services where music, Web pages, movies, television programs, videogames and/or other content is downloaded by an infotainment center 56 operatively connected to the telematics unit 14 via vehicle bus 34 and audio bus 58. In one non-limiting example, downloaded content is stored (e.g., in memory 38) for current or later playback.

Again, the above-listed services are by no means an exhaustive list of all the capabilities of telematics unit 14, but are simply an illustration of some of the services that the telematics unit 14 is capable of offering.

Vehicle communications generally utilize radio transmissions to establish a voice channel with carrier system 16 such that both voice and data transmissions may be sent and received over the voice channel. Vehicle communications are enabled via the cellular chipset/component 40 for voice communications and the wireless modem 42 for data transmission. In order to enable successful data transmission over the voice channel, wireless modem 42 applies some type of encoding or modulation to convert the digital data so that it can communicate through a vocoder or speech codec incorporated in the cellular chipset/component 40. It is to be understood that any suitable encoding or modulation technique that provides an acceptable data rate and bit error may be used with the examples disclosed herein. Generally, dual mode antenna 50 services the location detection chipset/component 44 and the cellular chipset/component 40.

The microphone 28 provides the user with a means for inputting verbal or other auditory commands, and can be equipped with an embedded voice processing unit utilizing human/machine interface (HMI) technology known in the art. Conversely, speaker 30 provides verbal output to the vehicle occupants and can be either a stand-alone speaker specifically dedicated for use with the telematics unit 14 or can be part of a vehicle audio component 60. In either event and as previously mentioned, microphone 28 and speaker 30 enable vehicle hardware 26 and call center 24 to communicate with the occupants through audible speech. The vehicle hardware 26 also includes one or more buttons, knobs, switches, keyboards, and/or controls 32 for enabling a vehicle occupant to activate or engage one or more of the vehicle hardware components. In one example, one of the buttons 32 may be an electronic pushbutton used to initiate voice communication with the call center 24 (whether it be a live advisor 62 or an automated call response system 62'). In another example, one of the buttons 32 may be used to initiate emergency services.

The audio component 60 is operatively connected to the vehicle bus 34 and the audio bus 58. The audio component 60 receives analog information, rendering it as sound, via the audio bus 58. Digital information is received via the vehicle bus 34. The audio component 60 provides AM and FM radio, satellite radio, CD, DVD, multimedia and other like functionality independent of the infotainment center 56. Audio component 60 may contain a speaker system, or may utilize speaker 30 via arbitration on vehicle bus 34 and/or audio bus 58.

Still referring to FIG. 1, the vehicle crash and/or collision detection sensor interface 52 is/are operatively connected to the vehicle bus 34. The crash sensors 54 provide information to the telematics unit 14 via the crash and/or collision detection sensor interface 52 regarding the severity of a vehicle collision, such as the angle of impact and the amount of force sustained.

Other vehicle sensors 64, connected to various sensor interface modules 66 are operatively connected to the vehicle bus 34. Example vehicle sensors 64 include, but are not limited to, gyroscopes, accelerometers, magnetometers, emission detection and/or control sensors, environmental detection sensors, and/or the like. One or more of the sensors 64 enumerated above may be used to obtain vehicle data for use by the telematics unit 14 or the call center 24 (when transmitted thereto from the telematics unit 14) to determine the operation of the vehicle 12. Non-limiting example sensor interface modules 66 include powertrain control, climate control, body control, and/or the like.

In a non-limiting example, the vehicle hardware 26 includes a display 80, which may be operatively directly connected to or in communication with the telematics unit 14, or may be part of the audio component 60. Non-limiting examples of the display 80 include a VFD (Vacuum Fluorescent Display), an LED (Light Emitting Diode) display, a driver information center display, a radio display, an arbitrary text device, a heads-up display (HUD), an LCD (Liquid Crystal Diode) display, and/or the like.

A portion of the carrier/communication system 16 may be a cellular telephone system or any other suitable wireless system that transmits signals between the vehicle hardware 26 and land network 22. According to an example, the wireless portion of the carrier/communication system 16 includes one or more cell towers 18, base stations 19 and/or mobile switching centers (MSCs) 20, as well as any other networking components required to connect the wireless portion of the system 16 with land network 22. It is to be understood that various cell tower/base station/MSC arrangements are possible and could be used with the wireless portion of the system 16. For example, a base station 19 and a cell tower 18 may be co-located at the same site or they could be remotely located, and a single base station 19 may be coupled to various cell towers 18 or various base stations 19 could be coupled with a single MSC 20. A speech codec or vocoder may also be incorporated in one or more of the base stations 19, but depending on the particular architecture of the wireless network 16, it could be incorporated within an MSC 20 or some other network components as well.

Land network 22 may be a conventional land-based telecommunications network that is connected to one or more landline telephones and connects the wireless portion of the carrier/communication network 16 to the call/data center 24. For example, land network 22 may include a public switched telephone network (PSTN) and/or an Internet protocol (IP) network. It is to be understood that one or more segments of the land network 22 may be implemented in the form of a standard wired network, a fiber or other optical network, a cable network, other wireless networks such as wireless local networks (WLANs) or networks providing broadband wireless access (BWA), or any combination thereof.

Call center 24 is designed to provide the vehicle hardware 26 with a number of different system back-end functions. According to the example shown here, the call center 24 generally includes one or more switches 68, servers 70, databases 72, live and/or automated advisors 62, 62', processing equipment (or processor) 84, a communications module 86, as well as a variety of other telecommunication and computer equipment 74 that is known to those skilled in the art. These various call center components are coupled to one another via a network connection or bus 76, such as one similar to the vehicle bus 34 previously described in connection with the vehicle hardware 26.

The processor 84, which is often used in conjunction with the computer equipment 74, is generally equipped with suitable software and/or programs enabling the processor 84 to accomplish a variety of call center 24 functions. More particularly, the various operations of the call center 24 are carried out by one or more computers (e.g., computer equipment 74) programmed to carry out the tasks of the method(s) disclosed herein (e.g., receiving calls, recognizing the channel used, transmitting notifications, etc.). The computers may include a network of servers (including server 70) coupled to both locally stored and remote databases (e.g., database 72) of any information processed.

In an example, the processor 84 is configured to run at least some of the computer programs and/or software for performing one or more steps of the method that are performed at the call center 24. For example, the processor 84 may include computer readable code for recognizing (from a call received from one of the subscriber vehicles 12, 12', 12") that a packet data channel is unavailable in a predetermined coverage region. Upon making such recognition, the processor 84 further includes computer readable code for identifying any subscriber vehicle 12, 12', 12" then-currently in, or within a predetermined distance of, the predetermined coverage region. Identifying other vehicles 12, 12', 12" may be accomplished by requesting a then-current location (in terms of latitude and longitude coordinates) from all of the subscriber vehicles (e.g., vehicles 12, 12', 12") having a garage address or zip code associated therewith in a predefined radius of the coverage region. In an example, the garage address or zip code may be retrieved from a user profile stored at the call center 24. Other vehicles 12, 12', 12' within the coverage region may also be identified when such vehicles call the call center 24 on a non-packet data channel. The vehicles 12, 12', 12" making such calls may be grouped according to their GPS coordinate data, the state (e.g., Michigan, Illinois, etc.) that the units are then-currently located in, a cellular network system identification number (SID), a zip code, an area code (NPA), or the like. The aggregation of this data may also assist the call center 24 in determining the geographic extent of the effected coverage area. Still further, the processor may be configured to run a computer program instructing the communications module 86 at the call center 24 to notify the identified vehicle(s) 12, 12', 12" (via a message transmitted from the call center 24 to a respective telematics unit of the vehicle(s) 12, 12', 12") that the packet data channel in that coverage region is unavailable.

The communications module 86 is configured to, via suitable communications equipment (such as equipment capable of handling messaging between the call center 24 and the telematics unit 14 (e.g., VehComm), modems, TCP/IP supporting equipment, a satellite broadcast system (not shown), and/or the like), enable the call center 24 to establish a communication with the telematics unit 14, or visa versa. The communications module 86 is also capable of simultaneously broadcasting a message to the telematics unit of each identified vehicle 12, 12', 12" within the predetermined coverage area. An example of such broadcasting is described in U.S. Pat. No. 7,532,859, entitled "Targeted Messaging for Mobile Vehicles Using Satellite-Radio Broadcasts" to Videtich, the contents of which is incorporated by reference herein. As stated above, such communications may be initiated in response to an instruction from the processor 84 upon recognizing that the packet data channel is unavailable in the predetermined coverage region. More specifically, the communications module 86 enables the call center 24 to notify the telematics unit 14 of the one or more vehicles 12, 12', 12" (via a channel other than a packet data channel) that the packet data channel is unavailable.

The notifications transmitted by the communications module 86 generally include messages and/or instructions for the telematics unit(s) 14. As one example, the notification may include instructions for the telematics unit 14 not to use the packet data channel for a predetermined time. As another example, the notification may include a message that the previously unavailable packet data channel has been restored or is available. Such notification(s) may be accomplished using i) a channel other than a packet data channel (e.g., when the packet data channel is unavailable), or ii) the restored packet data channel (e.g., when the packet data channel becomes available).

Switch 68, which may be a private branch exchange (PBX) switch, routes incoming signals so that voice transmissions are usually sent to either the live advisor 62 or the automated response system 62', and data transmissions are passed on to a modem or other piece of equipment (not shown) for demodulation and further signal processing. The modem preferably includes an encoder, as previously explained, and can be connected to various devices such as the server 70 and database 72.

It is to be appreciated that the call center 24 may be any central or remote facility, manned or unmanned, mobile or fixed, to or from which it is desirable to exchange voice and data communications. As such, the live advisor 62 may be physically present at the call center 24 or may be located remote from the call center 24 while communicating therethrough.

Additionally, the data transmission system 10 further includes a network provider 90, which is a separate and distinct entity from the call center 24. In an example, the network provider 90 is in operative communication with both the call center 24 and the telematics unit 14, and the network provider 90 owns and/or is responsible for the operation, maintenance, and/or repair of communication channels used by the telematics unit 14 and/or the call center 24 for transmitting data. Some non-limiting examples of such communication channels include packet data channels, circuit switched data channels, short range data channels, channels supporting SMS or other text messaging services, and/or the like.

In some instances, the network provider 90 is also associated with or is a cellular service provider that generally owns and/or operates at least the carrier/communication system 16. In one example, the network provider 90 leases components of the carrier/communication system 16 from the cellular service provider. In another example, the network provider 90 is also the cellular service provider. Accordingly, the call center 24 may work with the network provider 90 and/or the cellular service provider in order to provide services to the subscriber vehicles 12, 12', 12".

Although the network provider 90/cellular service provider may be located at the call center 24, it is to be understood that the call center 24 is also a separate and distinct entity from the network provider 90 and/or cellular service provider. In an example, the network provider 90 and/or cellular service provider is located remote from the call center 24. The network provider 90 and/or cellular service provider provides the user with telephone and/or Internet services, while the call center 24 is a telematics service provider. The cellular service provider (and in some instances, the network provider 90) is generally a wireless carrier (such as, for example, Verizon Wireless®, AT&T®, Sprint®, etc.). It is to be understood that the network provider 90 and/or cellular service provider may interact with the call center 24 to provide various service(s) to the user.

While not shown in FIG. 1, it is to be understood that in some instances, the call center 24 is a data center that receives voice or data calls, analyzes the request associated with the voice or data call, and transfers the call to an application specific call center. It is to be understood that the application specific call center may include all of the components of the call center 24, but is a dedicated facility for addressing specific requests, needs, etc. Examples of such application specific call centers are emergency services call centers, navigation route call centers, in-vehicle function call centers, or the like.

Figure 2:
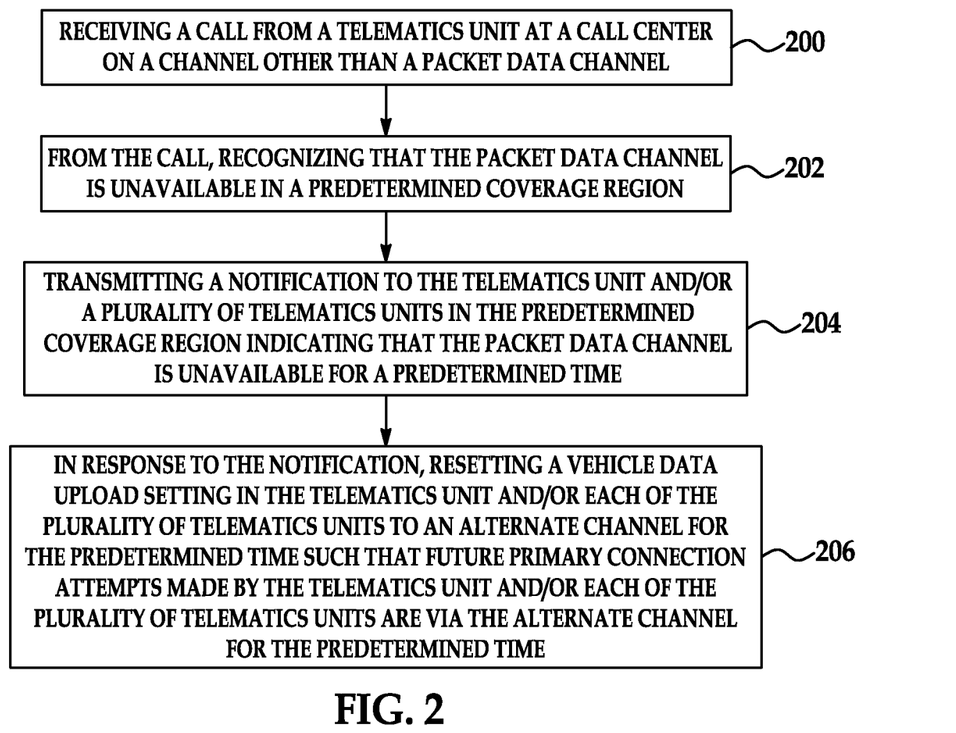
FIGS. 2 and 3 are flow diagrams depicting examples of a method for managing data transmissions in a subscriber pool.

Examples of the data transmission method will now be described herein in conjunction with FIGS. 2 and 3. Referring briefly to FIG. 2, the data transmission method generally includes receiving a call from the telematics unit 14 at the call center 24 on a channel other than a packet data channel (as shown by reference numeral 200); from the call and at the call center 24, recognizing that the packet data channel is unavailable in a predetermined coverage region (as shown by reference numeral 202); transmitting a notification to at least one of the telematics unit 14 or a plurality of telematics units in the predetermined coverage region indicating that the packet data channel is unavailable for a predetermined time (as shown by reference numeral 204); and in response to the notification, resetting a vehicle data upload setting in the telematics unit 14 and/or each of the plurality of telematics units to an alternate channel for the predetermined time such that primary connection attempts made by the telematics unit 14 and/or each of the plurality telematics units are via the alternate channel during the predetermined time (as shown by reference numeral 206).

To reiterate from above, the telematics unit 14 is generally configured to transmit vehicle data to an external entity (such as the call center 24) via the default setting of the VDU system 92. For purposes of the instant disclosure, such default setting includes using the packet data channel, run or operated by the network provider 90, to send packet data transmissions. Under normal operation, the telematics unit 14 transmits vehicle data to, e.g., the call center 24 according to the default setting, i.e., the packet data channel. When the packet data is rendered unavailable (which may first be recognized by the telematics unit 14 when a packet data connection cannot be established with the call center 24), the telematics unit 14 automatically switches (e.g., after one failed attempt or a predetermined number of failed attempts to connect via the packet data channel) to another channel to initiate the call. The telematics unit 14 completes the data transmission to the call center 24, for example, using this other channel. In an example, the other channel is any available channel other than the packet data channel. Some non-limiting examples of such other channels include a circuit-switched data channel, a data channel supporting SMS messaging, or a short range data channel.

In an example, the call center 24 is aware of the default setting of each telematics unit 14 that subscribes to its services. Such default settings may, for instance, be set by the manufacturer of the telematics unit 14 or may be selected by the call center 24 upon activating the telematics unit 14. In either instance, the settings of the telematics unit(s) 14 may be included in the profile of the vehicle 12 stored in the database 72 at the call center 24. When a call is received at the call center 24, the calling vehicle 12, 12', 12" is identified by the switch 68, and the default settings of the corresponding telematics unit 14 are made available to one of the servers 70 at the call center 24. Since the default setting of the telematics unit 14 making the call are known, the processor 84 (running appropriate software programs and/or routines) is capable of recognizing when the incoming call from the telematics unit 14 is on a channel other than the default channel (e.g., the packet data channel). Accordingly, upon receiving a call at the call center 24 over a channel other than a packet data channel, the call center 24 may deduce that the packet data channel is unavailable in the area within which the telematics unit 14 that made the call is then-currently located.

The unavailability of the packet data channel may be due to an outage (e.g., weather conditions have interrupted service, scheduled maintenance, etc.) or traffic on the channel. Upon recognizing that one or more calls have been received from another channel, the call center 24 may attempt to verify that the packet data channel is in fact unavailable. Verification of such unavailability may be made with the assistance of the network provider 90 or with information from the network provider 90.

In an example, verifying may be accomplished, by the processor 84 via suitable software programs and/or routines, using preexisting knowledge of the call center 24 and/or the network provider 90 that the packet data channel will be unavailable in a particular coverage region at a predetermined time. In some cases, such preexisting knowledge also includes the duration for which the channel will be unavailable. In an example, the preexisting knowledge may be embodied in a maintenance schedule of a packet data channel, where such maintenance schedule is predetermined and established by the network provider 90.

The maintenance schedule may be used, by the network provider 90, to apprise the call center 24 of the days and/or times at which the packet data channel in a particular coverage region will be unavailable for maintenance purposes. In an example, the network provider 90 may verify the unavailability of the packet data channel due to maintenance. Such verification may, in this particular example, be accomplished in response to a query from the call center 24 after recognizing that the packet data channel is unavailable.

In another example, the network provider 90 may send the entire maintenance schedule to the call center 24, which is stored in the database 72, and the maintenance schedule may be used by the call center 24 to verify the unavailability of the packet data channel. The sending of the maintenance schedule to the call center 24 may be accomplished automatically as the maintenance schedule is created and/or updated by the network provider 90, or may be sent in response to a request from the call center 24.

In many cases, the maintenance schedule also includes the day and/or time at which the packet data channel will be restored. Again, the network provider 90 may inform the call center 24 of the restoration of the packet data channel in response to the query for a status update by the call center 24. In an example, upon receiving a query from the call center 24, the network provider 90 may apprise the call center 24 that the packet data channel covering the northern region of the metropolitan Detroit area is expected to be unavailable, based upon the then-current maintenance schedule, for maintenance purposes starting on Mar. 1, 2010, and is expected to remain unavailable for the entire day. From such information, the call center 24 may deduce that the packet data channel should be restored at 12:00 am Mar. 2, 2010. As such, the maintenance schedule may be relied upon to estimate the approximate day and, in some instances, time that the packet data channel may be restored.

Verification that the packet data channel is experiencing an outage may also be accomplished by directly contacting the network provider 90. For example, if a storm has interrupted service in a particular area, the network provider 90 can inform the call center 24 (e.g., via an advisor 62) that the channel is down, and in some instances, an estimation of how long the channel will be down.

The packet data may be rendered unavailable due to traffic when, e.g., the number of units then-currently connected to the call center 24 via a non-packet data channel exceeds a predetermined threshold for the call center 24. The call center 24 may be expecting calls on the packet-data channel, but may be receiving such calls (which are coming from a particular geographic region) on a channel other than the packet data channel. When the number of calls are collectively received on the other channel (e.g., a circuit switched channel) exceeds the set threshold (e.g., 1,000 calls or more), the call center may deduce that there is a problem with packet data in one or more geographic areas.

The call center processor(s) 84 and/or other computer equipment 74 may identify the unavailable coverage region using mapping techniques. For example, when a large number of calls are received on the other (non-packet data) channel, the call center 24 can request and receive GPS coordinate data (or extract such GPS coordinate data if transmitted with the original call) from all or some of the calling units, and plot such coordinates on a map. The unavailable coverage region may be determined, at least in part, from the plotted GPS coordinates. For example, the maximum north, northeast, northwest, south, southeast, southwest, east, and/or west coordinates may be used to define a boundary or perimeter for the coverage region. Mapping enables the call center 24 to conclude, with relative certainty (depending upon the number of calls used to identify the unavailable coverage region), that the packet data channel in that identified coverage region is in fact unavailable.

The packet data may also be rendered unavailable due to traffic when, e.g., the local network itself (as opposed to the back-end call center 24) is overwhelmed due to a high volume of calls being made in a particular area. When the usage of a local network is higher than normal, the network provider 90 may recognize an overloaded packet data channel, and may inform the call center 24 (e.g., via an advisor 62) that the channel is temporarily overloaded. High volume or usage may result, for example, when a large number of vehicles 12, 12', 12" is concentrated in the same area, for example, during a festival, a sporting or other highly attended event, or a traffic jam. In such instances, the increased call volume on the local network may lead to the unavailability of the packet data channel.

It is to be understood that, in some instances, the call center 24 cannot verify the unavailability of the packet data channel. In such an instance, the call center 24 may cease the initial call, and attempt another communication with the calling telematics unit 14 over the packet data channel as a test of the channel. If the test call fails over the packet data channel, the call center 24 can deduce that the channel is unavailable.

After recognizing (and in some instances verifying) the unavailability of the packet data channel, the call center 24, via the communications module 86, transmits a notification to the telematics unit 14 indicating that the packet data channel is unavailable for a predetermined time. The call center 24 may also identify other subscriber vehicles 12', 12" that are then-currently located in the predetermined coverage area (e.g., via garage address, actual GPS coordinates of such vehicles, state, area code, zip code, or using combinations of such geographic information, or such vehicles have called in), and transmit a notification to the telematics units of each of the identified subscriber vehicles (e.g., vehicles 12, 12', 12" shown in FIG. 1). Still further, the call center 24 may have reason to believe that still other subscriber vehicles 12', 12" may enter the predetermined coverage area at some point during the unavailable period (e.g., such vehicles are within a predetermined radius of the coverage area and are traveling toward such area and/or have a garage address within the coverage area), and thus may transmit the notification to the telematics units of each of these identified subscriber vehicles. In this particular example, the reasoning of the call center 24 may be based, for example, on a travel history of vehicle 12, where such travel history indicates that the vehicle 12 will most likely enter the coverage region during the unavailable period. The travel history may be determined from a user profile stored in the database 72 at the call center 24, where such profile may include, for example, the user's garage address, the user's business address, points of interest inquired by the user, typical driving routes taken by the user, etc. From the information stored in the user's profile, the call center 24 may be able to predict the areas (at least within, e.g., a 30 mile radius) that the vehicle 12 (or plurality of vehicles 12', 12") will most likely travel during the unavailability of the packet data channel.

The notification includes a message instructing the telematics unit(s) 14 not to use the packet data channel. Such transmission will be accomplished using a channel other than the packet data channel. For instance, the message including the instruction may be an SMS message, where such message includes a header recognizable by the telematics unit 14 as a notification regarding the unavailability of the packet data channel. It is to be understood that other messaging techniques may be utilized, including, but not limited to, push notifications, control messaging, or the like. Upon recognizing the message, the contents of the instructions embodied in the message are downloaded to the telematics unit 14 and processed by the processor 36.

The notification from the call center 24 includes instructions for the processor 36 to reset the current vehicle data upload setting (i.e., the setting in the VDU 92 that triggers use of the packet data channel) to an alternate setting that triggers use of an alternate channel for subsequent transmission of data to the call center 24. Non-limiting examples of the channel other than the packet data channel include a circuit-switched data channel, a data channel supporting SMS messaging, and a short range data channel (e.g., Wi-Fi, etc.). Upon receiving the instructions, the processor 36 will reset the VDU 92 to the identified alternate setting according to the instructions. While the alternate setting is activated, any data transmissions attempted by the telematics unit 14 will take place on the alternate channel. As such, the telematics unit 14 uses the alternate channel without first attempting to use the unavailable packet data channel. For instance, if the alternate setting is a circuit-switched VDU connection, future data transmissions attempted by the telematics unit 14 takes place using a circuit-switched connection alone.

The instructions in the notification may or may not include a time limit for the alternate setting to be active. When a time limit is included in the instructions, such time limit is based upon the date and/or time that the packet data channel is expected to become available. In one example, if the unavailability is due to scheduled maintenance and the end time of the maintenance is known, the call center 24 may include in the notification an instruction to i) immediately set the alternate setting and ii) reset the previous (e.g., default) setting at the date/time corresponding with the maintenance end time. In another example, if the unavailability is due to damage from a storm and the network provider 90 can estimate the time for repair, the call center 24 may include in the notification an instruction to i) immediately set the alternate setting and ii) reset the previous (e.g., default) setting at the date/time corresponding with the expected repair time. In yet another example, if the unavailability is due to traffic on the channel because the telematics service provider is offering a special on a new service, the call center 24 may include in the notification an instruction to i) immediately set the alternate setting and ii) reset the previous (e.g., default) setting when the service promotion expires. In still another example, the call center 24 may include in the notification an instruction to i) immediately set the alternate setting and ii) wait for further instructions before switching back to the previous (e.g., default) setting.

The time limit included in the instructions may also be based upon the projected time during which a particular telematics unit 14 or a plurality of telematics units is/are expected to be within the predetermined coverage region or within a predetermined radius of the coverage region. As one example, the notification may be broadcast to all of the subscriber vehicles 12, 12', 12" having a garage address in the predetermined coverage region. In this particular instance, the time limit may be for the entire time that the packet data channel is expected to be unavailable. As another example, when it is recognized that the calling vehicle 12 is passing through the predetermined coverage area (e.g., the garage address is not in the area and the vehicle 12 is traveling in the area), the notification may be personalized for the vehicle 12 such that the alternate setting is triggered for an open ended time or for a time that the vehicle 12 is expected to be in the area (which may be based upon navigation instructions requested by the vehicle 12, driving history of the vehicle 12, or other data known to the call center 24).

In addition to the time limit, it is to be understood that the notification may also include additional instructions following expiration of the time limit. As previously mentioned, such additional instructions may simply be to switch back to the packet data channel setting upon expiration of the time. However, the additional instructions may also be included that instruct the processor 36 to switch back to the packet data channel setting and attempt to make a test call to the call center 24 over the packet data channel. Such instructions may further instruct the processor 36 to maintain the packet data channel setting if the test call is successfully transmitted, or to switch back to the alternate setting for another predetermined time period of the test call is unsuccessful.

Figure 3:
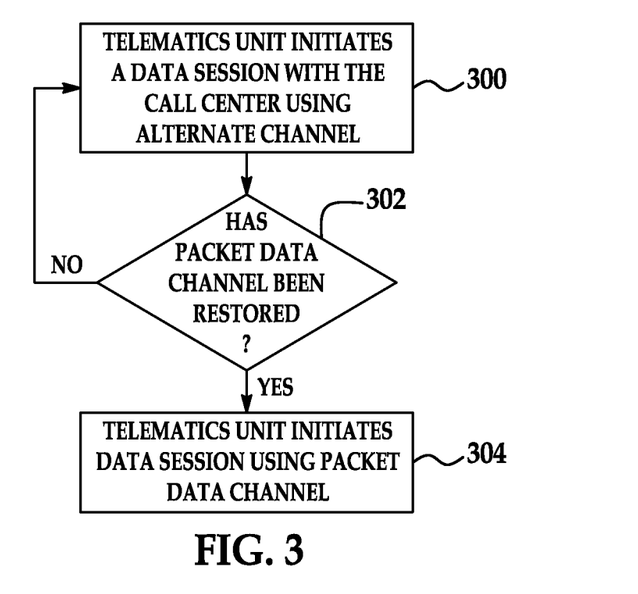

Referring now specifically to FIG. 3, upon switching to the alternate channel, the telematics unit 14 is then able to transmit data to the call center 24 (or other entity) using the alternate channel (as shown by reference numeral 300). In an example, the telematics unit 14 continues to use the alternate data channel to transmit data to the call center 24 until the telematics unit 14 has been notified that the packet data channel is available, or until the time limit(s) included in the instructions has/have expired.

The call center 24 may recognize that the packet data channel has become available in a variety of ways, as described herein. In some examples, the telematics unit 14 may actually submit a query message to the call center 24 using the alternate channel inquiring whether or not the packet data channel has been restored (as shown by reference numeral 302). If the packet data channel has become available when the inquiry from the telematics unit 14 is received, the call center 24 may transmit another notification including instructions for the processor 36 to switch back to the previous VDU setting, so that the packet data channel is used for data transmissions.

In another example, the call center 24 may determine that the packet data channel has become available by querying one or more of the plurality of telematics units 14 then-currently located in the predetermined coverage region. In an example, the query message is sent from the call center 24 to the telematics unit(s) 14 in the predetermined coverage area using an alternate channel, where such query message includes an instruction for the telematics unit(s) 14 to respond with a test call using the packet data channel. In instances where at least one of the queried telematics units 14 is able to successfully respond to the message using the packet data channel, the call center 24 may deduce that the packet data channel has become available. It is to be understood that such instructions may further instruct the processor 36 to maintain the packet data channel setting if the test call is successfully transmitted, or to switch back to the alternate setting for another predetermined time period of the test call is unsuccessful.

In still another example, the network provider 90 may indicate that the channel is available (either on its own or in response to a query from the call center 24), or another telematics unit 14 in the coverage area may complete a packet data channel call (e.g., a telematics unit 14 not previously reset to the alternate channel may contact the call center 24).

If the previously notified telematics unit(s) 14 is/are awaiting further instruction for when to switch back to the packet data channel VDU setting or the time limit for use of the alternate channel has not expired, the call center 24 may transmit another notification including instructions for the processor 36 to switch back to the previous VDU setting, so that the packet data channel is used for data transmissions. The other notification (i.e., the message that the packet data channel has become available) may come from the call center 24 using the now-available packet data channel or the alternate channel. Such a message may be transmitted to a particular telematics unit 14 or may be broadcast to all of the telematics units 14 that were previously reconfigured to the alternate channel setting. In an example, the notification may be embodied in an SMS message, where such message includes an instruction to re-initiate use of the now-available packet data channel. Upon receiving this message, the processor(s) 36 associated with the telematics unit(s) 14 processes the message and resets the VDU setting so that transmission of vehicle data is again accomplished using the packet data channel. The telematics unit(s) 14 at some point thereafter initiates a new data session with the call center 24 using the available packet data channel (as shown by reference numeral 304 in FIG. 3).

It is to be understood that the subsequently received message will trigger the resetting of the vehicle data upload setting, even if a previous instruction was to use the alternate channel for the predetermined time. As such, any subsequently received instructions will be carried out, and will override any previous instructions. In some instances then, the restoration of the in-vehicle VDU setting that triggers use of the packet data channel may be earlier than originally expected (i.e., before expiration of the set time limit).

Furthermore, it is to be understood that if the telematics unit(s) 14 instructions were to remain on the alternate setting for a predetermined time, a subsequent notification may not be sent from the call center 24, but rather the time may be allowed to expire. Upon expiration of the time limit (and when no additional instructions are received), the processor 36 will carry out the original instructions and automatically reset the VDU setting to the default setting which triggers data transmission over the packet data channel.

When the packet data channel is down due to an outage, the restoring of the packet data channel may be accomplished by the network provider 90, and such restoration includes repairing or otherwise making the packet data channel available for future use at least by the telematics unit 14. When the packet data channel is unavailable due to traffic, the restoration is accomplished when the call volume reduces.

While several examples have been described in detail, it will be apparent to those skilled in the art that the disclosed examples may be modified. Therefore, the foregoing description is to be considered exemplary rather than limiting.

The invention claimed is:

1. A method for managing data transmissions in a subscriber pool, comprising:
   receiving a call from a telematics unit at a call center on a channel other than a packet data channel;
   from the call and at the call center, recognizing that the packet data channel is unavailable in a predetermined coverage region;
   transmitting a notification to at least one of the telematics unit or a plurality of telematics units in the predetermined coverage region indicating that the packet data channel is unavailable for a predetermined time;
   in response to the notification, resetting a vehicle data upload setting in at least one of the telematics unit or each of the plurality of telematics units to an alternate channel for the predetermined time such that primary connection attempts made by the at least one of the telematics unit or each of the plurality of telematics units are via the alternate channel during the predetermined time; and
   verifying, by the call center, that the packet data channel is unavailable by:
     checking a predetermined maintenance schedule of the packet data channel over the predetermined coverage region, the maintenance schedule being established by a network provider; or
     mapping areas located within the predetermined coverage region where the telematics unit cannot establish a connection with the packet data channel.

2. The method as defined in claim 1 wherein the notification includes a message, transmitted from the call center to the at least one of the telematics unit or the plurality of telematics units, including an instruction not to use the packet data channel.

3. The method as defined in claim 1 wherein the channel other than the packet data channel includes a circuit-switched data channel, a data channel supporting SMS messaging, or a short range data channel.

4. The method as defined in claim 1 wherein the alternate channel includes a circuit-switched data channel, a data channel supporting SMS messaging, or a short range data channel.

5. The method as defined in claim 1, further comprising
   realizing, via the call center, that the packet data channel is available prior to the expiration of the predetermined time; and instructing the at least one of the telematics unit or the plurality of telematics units to reset the vehicle data upload setting in the at least one of the telematics unit or each of the plurality of telematics units to the packet data channel.

6. The method as defined in claim 1, further comprising continuing to transmit the vehicle data from the telematics unit or the plurality of telematics units in the predetermined coverage region to the call center using the alternate channel until the predetermined time expires or until an other notification is received identifying that the packet data channel has become available.

7. The method as defined in claim 6 wherein the packet data channel is unavailable due to an outage, and wherein the method further comprises:
   restoring the packet data channel via a network provider;
   transmitting an other notification to the telematics unit or the plurality of telematics units indicating that the packet data channel has been restored; and
   in response to the other notification, resetting the vehicle data upload setting in the at least one of the telematics unit or each of the plurality of telematics units to the packet data channel.

8. The method as defined in claim 7 wherein the notification includes instructions to reset the vehicle data upload setting to a default setting including the packet data channel so that future primary connections attempts made by the at least one of the telematics unit or the plurality of telematics units are via the packet data channel.

9. The method as defined in claim 7 wherein the transmitting of the other notification is accomplished using the alternate channel.

10. The method as defined in claim 1 wherein the unavailability of the packet data channel in the predetermined coverage region is due to traffic on the packet data channel, and wherein the method further comprises:
   Querying, by the call center, the plurality of telematics units that are then-currently located in the predetermined coverage region; and
   determining, by the call center, that the packet data channel is available when at least one of the plurality of telematics units successfully transmits packet data to the call center from within the predetermined coverage region.

11. A system for managing data transmissions in a subscriber pool, comprising:
   a plurality of telematics units operatively disposed in a plurality of respective mobile vehicles then-currently located in a predetermined coverage region of a packet data channel, the plurality of telematics units being configured to transmit vehicle data to a call center in operative communication therewith via a wireless connection;
   processing equipment operatively associated with the call center, the processing equipment configured to run computer readable code from a non-transitory computer readable medium, for recognizing that the packet data channel is unavailable in the predetermined coverage region;
   a communications module, at the call center and in operative communication with the processing equipment, configured to i) receive a call from at least one of the plurality of telematics units on a channel other than the packet data channel, and ii) transmit a notification to each of the plurality of telematics units that the packet data channel is unavailable for a predetermined time;
   a processor operatively connected to each of the plurality of telematics units, the processor including computer readable code on an other non-transitory computer readable medium, for resetting a vehicle data upload setting in each of the plurality of telematics units to an alternate channel for the predetermined time such that primary connection attempts made by each of the plurality of telematics units are via the alternate channel during the predetermined time; and
   a network provider in operative communication with the call center, the network provider configured to establish a maintenance schedule of the packet data channel over the predetermined coverage region, wherein the maintenance schedule is used by the computer readable code run by the processing equipment at the call center to recognize that the packet data channel is unavailable in the predetermined coverage region.

12. The system as defined in claim 11 wherein the network provider is further configured to restore the packet data channel in the predetermined coverage region, and wherein when the packet data channel has been restored, the communications module being further configured to transmit an other notification to each of the plurality of telematics units that the packet data channel has been restored.

13. The system as defined in claim 12 wherein, upon receiving the other notification that the packet data has been restored, the processor operatively connected to each of the plurality of telematics units is further configured to reset the vehicle data upload setting in the at least one of the telematics unit or each of the plurality of telematics units to the packet data channel.

14. The system as defined in claim 11 wherein the notification includes a message including an instruction, for each of the plurality of telematics units, not to use the packet data channel.

15. The system as defined in claim 11 wherein the channel other than the packet data channel includes a circuit-switched data channel, a data channel supporting SMS messaging, or a short range data channel.

16. The system as defined in claim 11 wherein the alternate channel includes a circuit-switched data channel, a data channel supporting SMS messaging, or a short range data channel.

* * * * *